United States Patent [19]

Komatsubara

[11] Patent Number: 5,466,139
[45] Date of Patent: Nov. 14, 1995

[54] VULCANIZER

[75] Inventor: Yoshitada Komatsubara, Ageo, Japan

[73] Assignee: Bridgestone Cycle Co., Ltd., Japan

[21] Appl. No.: 275,044

[22] Filed: Jul. 13, 1994

[30] Foreign Application Priority Data

Jul. 14, 1993 [JP] Japan ................... 5-043448 U

[51] Int. Cl.[6] .................................................. B29C 35/02
[52] U.S. Cl. ........................... 425/35; 425/34.1; 425/47
[58] Field of Search ........................... 425/34.1, 35, 46, 425/47, 394, 406

[56] References Cited

U.S. PATENT DOCUMENTS

| | | | |
|---|---|---|---|
| 3,741,696 | 6/1973 | Greenwood | 425/46 |
| 3,870,443 | 3/1975 | Schatz | 425/28 R |
| 4,144,007 | 3/1979 | Singh | 425/34.1 |
| 4,245,971 | 1/1981 | MacMillan | 425/406 |
| 4,453,902 | 6/1984 | Imbert | 425/47 |
| 4,561,626 | 12/1985 | Black | 249/118 |
| 4,580,959 | 4/1986 | Pizzorno et al. | 425/46 |
| 4,669,964 | 6/1987 | Amano et al. | 425/34.1 |
| 5,165,939 | 11/1992 | Pizzorno | 425/34.1 |

FOREIGN PATENT DOCUMENTS

| | | |
|---|---|---|
| 59-22741 | 2/1984 | Japan . |
| 59-138432 | 8/1984 | Japan . |

*Primary Examiner*—James P. Mackey
*Attorney, Agent, or Firm*—Knobbe Martens Olson & Bear

[57] ABSTRACT

A vulcanizer constructed in that a body structure which is wide in the vertical direction is provided above a lower frame for supporting a lower mold in such a manner that an opening/closing and tightening mechanism is disposed below a laterally extending plane of an upper mold and a lower mold. Accordingly, there is no opening/closing and tightening mechanism in the periphery of a radial direction of the upper and lower molds, which makes it possible to utilize a split mold of a complex shape.

5 Claims, 3 Drawing Sheets

VULCANIZER

BACKGROUND OF THE INVENTION

1. Field of the Invention

The present invention relates to a vulcanizer in which a vulcanized object such as a green tire contained within a mold is vulcanized.

2. Description of the Related Art

Conventionally, a Bag-O-Matic type vulcanizer is known. This Bag-O-Matic vulcanizer is constructed such that an upper mold is an opening/closing type which rotates and moves vertically. However, in a vulcanizer in which a mold opening/closing mechanism can be also used as a tightening mechanism, a top link or a base serves as a component which applies a mold-tightening load to a mold.

FIG. 2 is a partially cutaway front view schematically showing a conventional Bag-O-Matic vulcanizer. In this drawing, an tipper mold 1 and a lower mold 2 are integrally and respectively fixed to bases $5_1$ and $5_2$ via a platen portion 3 and a heat insulating layer 4. The base $5_1$ on the upper mold 1 side is fixed to an upper frame $6_1$, while the base $5_2$ on the lower mold 2 side is fixed to the lower frame $6_2$. It should be noted that the upper mold 1 and the lower mold 2 are covered respectively by domes $7_1$ and $7_2$.

A side frame 8 disposed to the side of the lower mold 2 is provided with a large gear 9 indicated by a dotted line in FIG. 2. The large gear 9 is rotatable by an unillustrated small gear. Next, a link 10 is eccentrically supported by the large gear 9, thus causing the link 10 to move vertically together with rotation of the large gear 9. A main shaft 11 is attached to this link 10. The movement of the main shaft 11 causes the upper mold 1 to open and close, or to be tightened.

In this way, since the large gear 9 used for opening and closing the upper and lower molds is disposed at the side of the lower mold 2, there is almost no space at the side thereof. For this reason, it becomes difficult to provide a mold such as a split mold, which requires a large space. There has been a demand for improvement in this respect. It should be noted that, in FIG. 2, numerals 12, 13, 14 and 15 designate a side plate, a main shaft for a large gear, a product extruding device and an upper mold adjusting screw, respectively.

Additionally, in order to vulcanize a tire, for example, a three-part mold is used which is formed by upper and lower molds for forming shoulder and side sections of the tire, and a sector mold for forming a crown section. Since this sector mold is formed from a set ring, outer ring, guide ring, inner top plate, outer top plate, segment and the like, the size of the split mold markedly becomes large, and particularly, becomes wide in the radial direction of the tire.

On the other hand, a vulcanizer in which a mold opening/closing mechanism and a tightening mechanism are separately provided, is formed by a fixed lower mold disposed on a base frame and a movable upper mold supported by a frame above the fixed lower mold. Further, there is also provided a vertically moving/sliding mechanism which moves the upper mold vertically so as to open or close both upper and lower molds. Usually, the vertically moving/sliding mechanism is adapted to slide up and down between the vertical moving slide disposed at an upper side of the movable upper mold and a guide off a side slide. The vertical movement of the upper mold is performed by reversely rotating a male screw shaft supported by a cylindrical body which is fixed to the vertical moving slide. In this vulcanizer, the base plate which supports and fixes the lower mold portion is formed into a gate-shaped configuration. Further, provided in an upper portion of the upper mold is a screw-type, mold height adjusting mechanism.

However, even in this example, the space in the periphery of the lower mold is restricted by the side frames disposed at right and left sides off the mold. Accordingly, in the same way as the case of the above-described Bag-O-Matic vulcanizer, it was difficult to make a large-size mold based on the use of a split mold.

The above-described conventional vulcanizers have the following two drawbacks.

One is that conventional vulcanizers in recent years cannot use a mold, such as a split mold, for forming a tire whose outer diameter and height are large. As a result, the need arises for large facilities for accommodating the split mold, which increases product cost.

Another is the difficulty of a vulcanizer accommodating various types of molds, which results in lowering of productivity.

SUMMARY OF THE INVENTION

In order to solve the above-described drawbacks of conventional vulcanizers, the present invention has been proposed as follows.

There is provided a vulcanizer according to the present invention, comprising: an upper mold; a lower mold disposed below the upper mold so as to correspond to the upper mold; an opening/closing and tightening mechanism which opens and closes, and tightens the upper mold and the lower mold and which is provided in a vicinity of the upper mold and the lower mold; an upper frame for supporting the upper mold; a lower frame for supporting the lower mold; and a body structure (i.e., a platform) provided above the lower frame such that the opening/closing and tightening mechanism is disposed below a laterally extending plane of the upper and lower molds, the body structure being wide in the vertical direction.

In accordance with the present invention, when a body structure is provided on the lower frame so as to raise the upper and lower molds, a space for accommodating the lower mold, which is restricted by large gears and side frames disposed on both sides off the mold, can be expanded (i.e., widened) in the horizontal direction. As a result, the vulcanizer according to the present invention can correspond to a large-sized split mold.

In other words, since the upper surface structure of the base frame, which supports and fixes the lower mold section, is formed into a cubic configuration, i.e., the shape of a box, it is possible to obtain production facilities which can correspond to a large-sized tire or the like.

In accordance with the above-described construction and operation, the present invention has the following effects: (1) since the vulcanizer according to the present invention is constructed such treat the upper structure is added to the lower frame, the cost of the equipment can be reduced and the term of fabrication can be shortened; and (2) since the vulcanizer having the above-described construction can correspond to the split mold, productivity (working efficiency) improves.

DESCRIPTION OF THE PREFERRED EMBODIMENTS

The present invention will be described further in detail on the basis of an embodiment described below.

Figure 1:
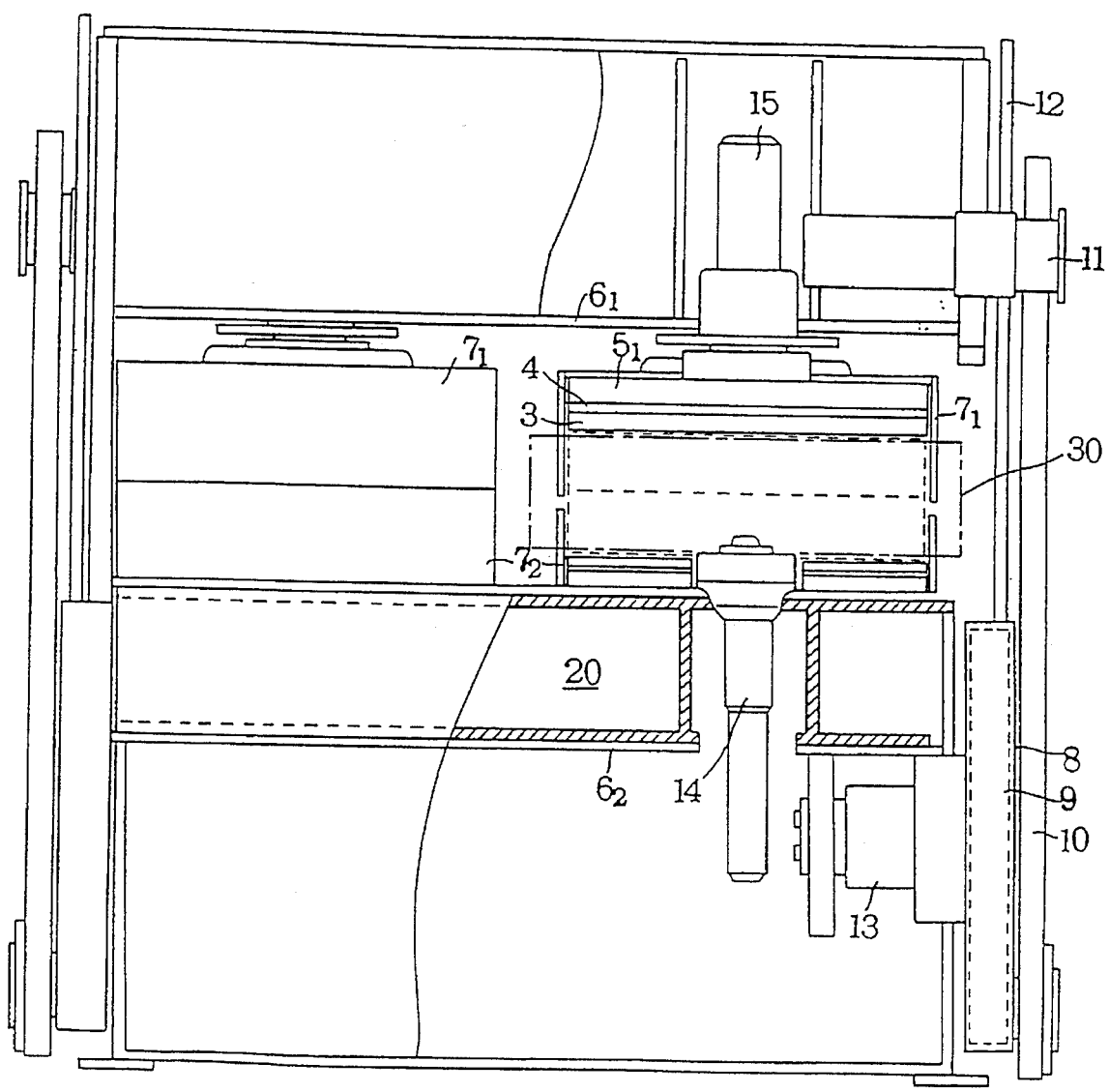
FIG. 1 is a partially cutaway front view of a vulcanizer according to the present invention.

FIG. 1 is a partially cutaway view of a Bag-O-Matic vulcanizer according to the present invention.

Numeral 20 indicates an upper structure of a lower frame, which is formed into a Japanese-wooden-clog(geta)-like shape (i.e., a footed platform shape) so as to raise an upper mold and a lower mold.

The upper surface of the upper structure 20 is positioned above a top plane of a side frame 8 surrounding a large gear 9. The lower mold 2 is fixed to the upper surface of the upper structure 20.

Figure 2:
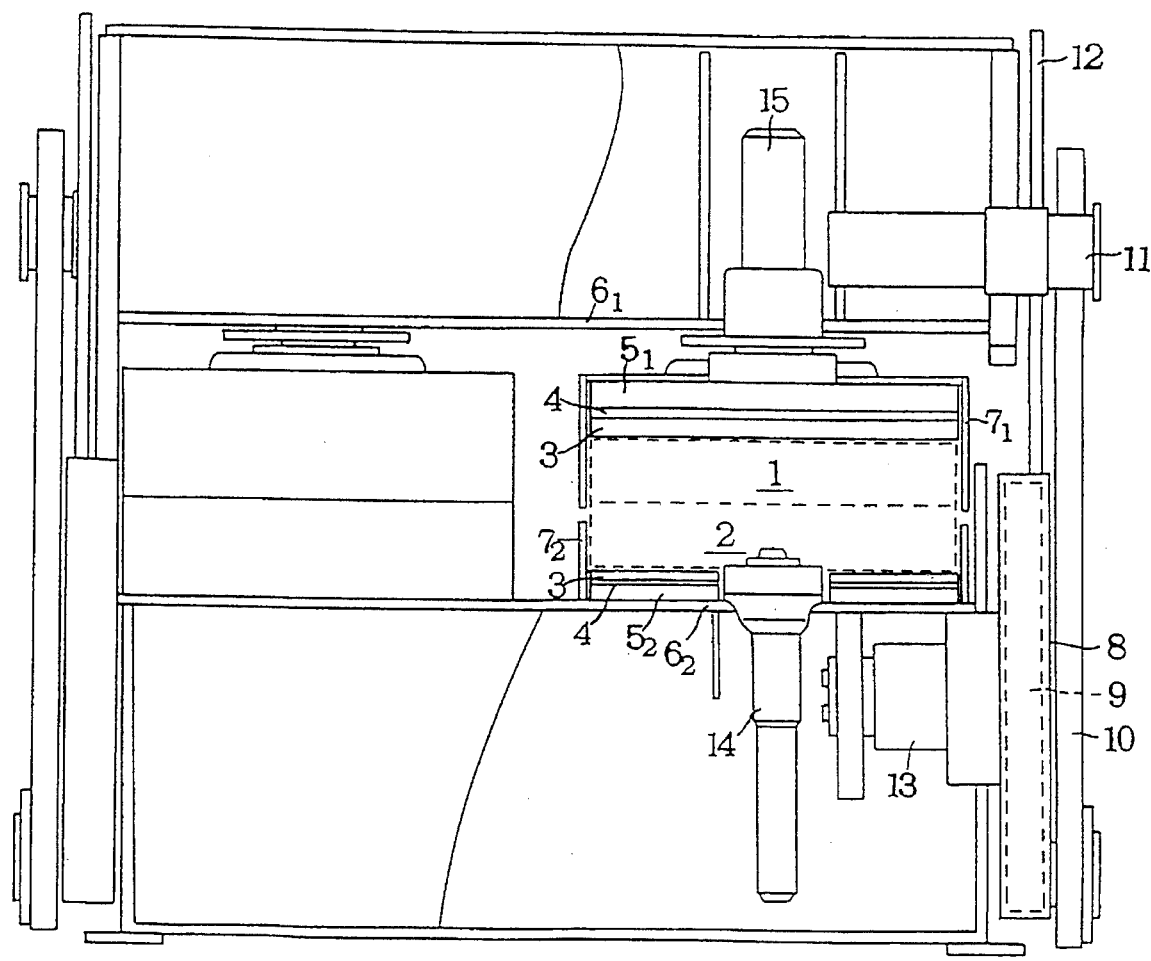
FIG. 2 is a partially cutaway front view of a conventional vulcanizer.
Figure 3:
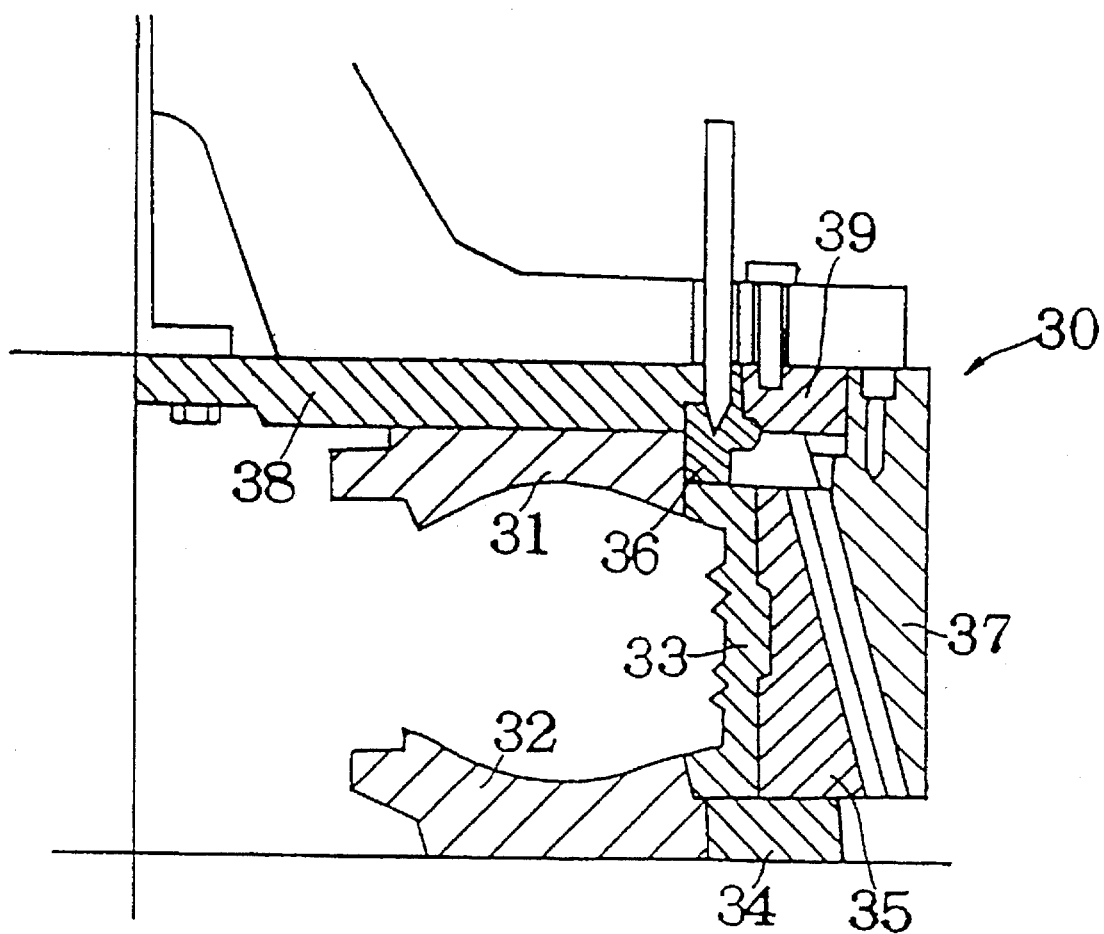
FIG. 3 is a cutaway view schematically illustrating a split mold for forming a tire.

It should be noted that the same numerals as those in FIG. 2 will have the same functions, and a description thereof will be omitted.

With reference to a split mold, in order to vulcanize a tire, for example, a three-part split mold 30 is used, which is, as schematically shown in FIG. 8, formed from an upper mold 31 and a lower mold 32 both for forming a shoulder section and a side section of the tire and a sector mold 33 for forming a crown section. The vertical positioning of the sector mold 33 is determined by a see ring 34 and a guide ring 36. The position thereof in a left-to-right direction is determined by an outer ring 37. Next, the three mold sections 31, 32, and 33 are tightened by an inner top plate 38, an outer top plate 39 and the like, and the sector mold 33 is tightened or opened by obliquely sliding the outer ring 37 connected to the outer top plate 39 with respect to a segment 35 integrated with the sector mold 33. For this reason, the mold markedly becomes large in size, and particularly, becomes wider in the radial direction of the tire.

Especially, when the width of the tire becomes large or a groove pattern formed in the crown section becomes complex, the sector mold 33 for forming the crown section of the tire is also used together with the upper mold 31 and the lower mold 32 both for forming the shoulder section and the side section of the tire. As a result, the width of the mold becomes large by a portion of each member forming the sector mold 33.

For this reason, it was impossible to equip a conventional vulcanizer with the split mold 30 left as is. Therefore, a need to manufacture a new vulcanizer arose which meant an increase in cost.

However, according to the present invention, the upper structure portion of the lower frame used for supporting the lower mold, is formed in a Japanese wooden clog like-shape (i.e., a footed platform shape) so as to raise the mold, which means there is no side frame around the mold. Accordingly, a complex split mold 30, as indicated by a one-dot and chain line in FIG. 1, can be used in a conventional vulcanizer, which does not lead to an increase in cost.

What is claimed is:

1. In a vulcanizer comprising:

an upper mold;

a lower mold disposed below said upper mold so as to correspond to said upper mold;

an upper frame for supporting said upper mold;

a lower frame for supporting said lower mold; and an opening and closing mechanism which opens and closes, and tightens said upper and lower molds by vertically sliding said upper frame via a link connecting said opening and closing mechanism and said upper frame, and which is provided on the side of said lower frame in a vicinity of said upper and lower molds, wherein the improvement comprises:

a platform placed between said lower mold and said lower frame, said platform having a height sufficient to raise the level of the lowermost point of said lower mold higher than the uppermost point of said opening and closing mechanism, but not affecting the spatial relationship between said upper and lower molds.

2. The vulcanizer according to claim 1, wherein said platform has a height such that the upper most point of said platform is higher than the upper part of said opening and closing mechanism.

3. The vulcanizer according to claim 1, wherein said platform is a hollow box shape.

4. The vulcanizer according to claim 1, wherein said platform is footed.

5. The vulcanizer according to claim 1, wherein said upper and lower molds are a three-part split mold for forming a tire.

* * * * *